(12) United States Patent
Andrei et al.

(10) Patent No.: US 7,963,704 B2
(45) Date of Patent: Jun. 21, 2011

(54) HERMAPHRODITIC FIBRE OPTICAL CONNECTOR SYSTEM

(75) Inventors: Bogdan Andrei, Lisle, IL (US); Yuriy Belenkiy, Wheeling, IL (US); Barbara Grzegorzewska, Riverside, IL (US); Malcolm Hodge, Chicago, IL (US); Ilya Makhlin, Wheeling, IL (US); Thomas Marrapode, Naperville, IL (US); Thomas Schiltz, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 225 days.

(21) Appl. No.: 11/883,960

(22) PCT Filed: Jan. 24, 2006

(86) PCT No.: PCT/US2006/002568
§ 371 (c)(1),
(2), (4) Date: Apr. 22, 2009

(87) PCT Pub. No.: WO2006/086153
PCT Pub. Date: Aug. 17, 2006

(65) Prior Publication Data
US 2009/0279832 A1    Nov. 12, 2009

Related U.S. Application Data

(60) Provisional application No. 60/651,534, filed on Feb. 8, 2005.

(51) Int. Cl.
*G02B 6/38* (2006.01)

(52) U.S. Cl. ............................................ 385/69; 385/92

(58) Field of Classification Search ........................ None
See application file for complete search history.

(56) References Cited

U.S. PATENT DOCUMENTS

| | | | |
|---|---|---|---|
| 4,445,750 A | 5/1984 | Grois et al. | |
| 4,684,205 A | 8/1987 | Margolin et al. | |
| 4,787,699 A | 11/1988 | Moulin | |
| 4,963,102 A | 10/1990 | Gettig et al. | |
| 5,293,582 A | 3/1994 | Beard et al. | |
| 5,940,560 A | 8/1999 | De Marchi et al. | |
| 6,116,790 A | 9/2000 | Vergeest | |
| 6,234,683 B1 | 5/2001 | Waldron et al. | |
| 6,298,190 B2 | 10/2001 | Waldron et al. | |

(Continued)

FOREIGN PATENT DOCUMENTS

EP    1273944 A1 *  1/2003

OTHER PUBLICATIONS

International Preliminary Examination Report for PCT Patent Application No. PCT/US2006/0002568. Aug. 14, 2007.

(Continued)

*Primary Examiner* — Omar Rojas
(74) *Attorney, Agent, or Firm* — Timothy M. Morella (57) ABSTRACT

The connector system provides two identical hermaphroditic housings, which accomplish a reliable connection of standard optical fiber connectors without the use of an adaptor. The connector system includes a first housing mounted to a first printed wiring board and a second housing mounted to a second printed wiring board. Each housing supports an optical fiber connector therein. Each housing includes an inner member and an outer member. Springs are provided between the inner and outer members to provide biasing of the housings in the mating direction of the optical connectors.

9 Claims, 5 Drawing Sheets

U.S. PATENT DOCUMENTS

| | | | |
|---|---|---|---|
| 6,361,218 B1 * | 3/2002 | Matasek et al. | 385/60 |
| 6,394,662 B1 * | 5/2002 | Foster | 385/60 |
| 6,419,399 B1 | 7/2002 | Loder et al. | |
| 6,461,053 B1 | 10/2002 | Mayercik et al. | |
| 6,513,989 B1 | 2/2003 | Bleck et al. | |
| 6,769,814 B2 * | 8/2004 | Kiani et al. | 385/78 |
| 6,789,950 B1 | 9/2004 | Loder et al. | |
| 2004/0052472 A1 * | 3/2004 | Roth et al. | 385/56 |

OTHER PUBLICATIONS

International Search Report and Written Opinion for PCT Patent Application No. PCT/US2006/0002568. May 30, 2006.

* cited by examiner

HERMAPHRODITIC FIBRE OPTICAL CONNECTOR SYSTEM

CROSS REFERENCE TO RELATED APPLICATIONS

The Present Application is a U.S. National Phase entry from, and claims priority to, PCT Patent Application No. PCT/US2006/00 2568, now expired, which was filed with the United States Receiving Office of the Patent Cooperation Treaty on 08 Aug. 2007. Further, the Present Application, through the PCT Patent Application referenced above, claims priority to U.S. Provisional Patent Application No. 60/651,534, now expired, which was filed with the United States Patent and Trademark Office on 08 Feb. 2005.

BACKGROUND OF THE INVENTION

In order to make electronic systems more flexible, system hardware designers have developed mid-plane designs for mating circuit boards within electronic equipment chassis. The mid-plane design provides a chassis that allows a circuit board or card to plug in from both the front and back of the chassis. The mid-plane design requires new types of interconnect systems that allow the circuit boards or cards to interconnect with each other. Unlike single card to back plane connectors, these circuit boards or cards must allow for misalignment from two circuit boards or cards and still form a reliable connection. Although guidance frames or adaptor such as the one shown in U.S. Pat. No. 6,315,590 to Grois et al. can be used to assist the interconnect system, use of such frames or adaptors add additional components to the system and therefore add to the complexity and expense of the assembly and maintenance.

SUMMARY OF THE INVENTION

A connector system which does not require a guidance frame or adaptor is provided. The connector system provides two identical hermaphroditic housings with spring loaded inner members in which a prior art connector such as a standard MPO connector is mounted. The housings are joined together to accomplish a reliable connection between the connectors with a minimal number of parts. The connector system overcomes problems presented in the prior art and provides additional advantages over the prior art. Such advantages will become clear upon a reading of the attached specification in combination with a study of the drawings.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 9:
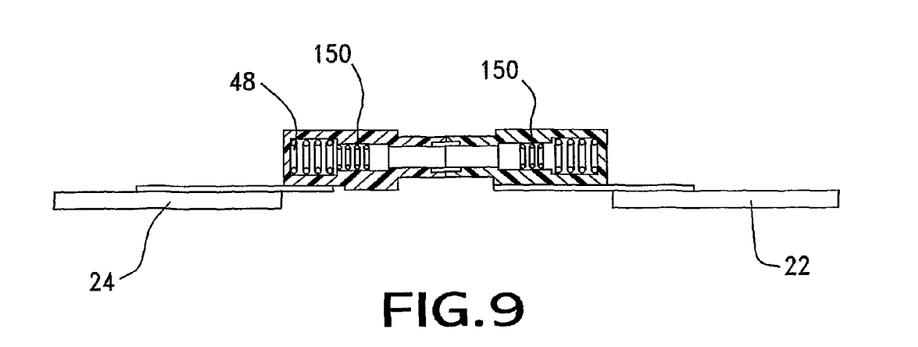
FIG. 9 is a cross-sectional schematic of the hermaphroditic connector system in a final mated condition shown in FIG. 1.
Figure 10:
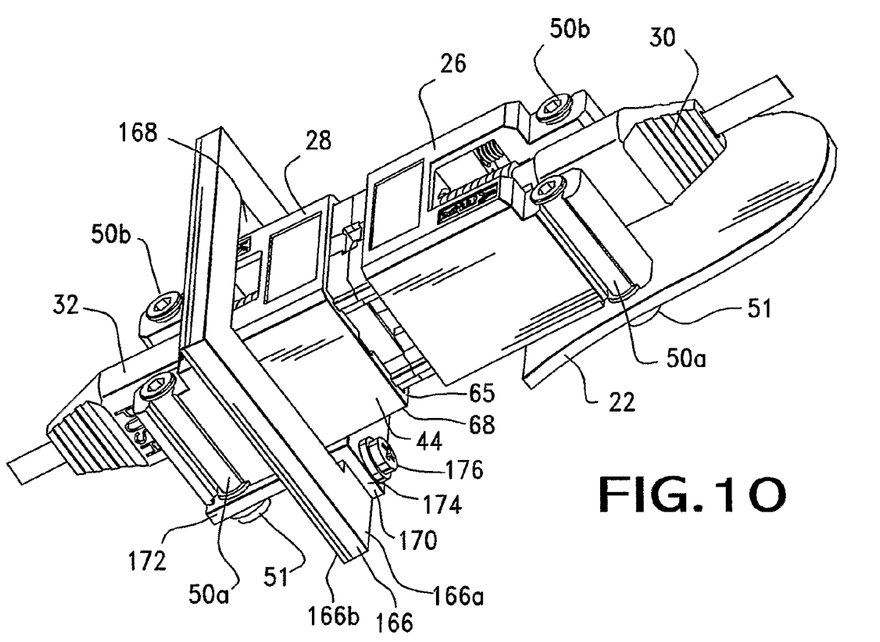
FIG. 10 is a perspective view of the hermaphroditic connector system of FIG. 1, shown in a mated condition and mounted on printed wiring boards in a backplane arrangement.
Figure 11:
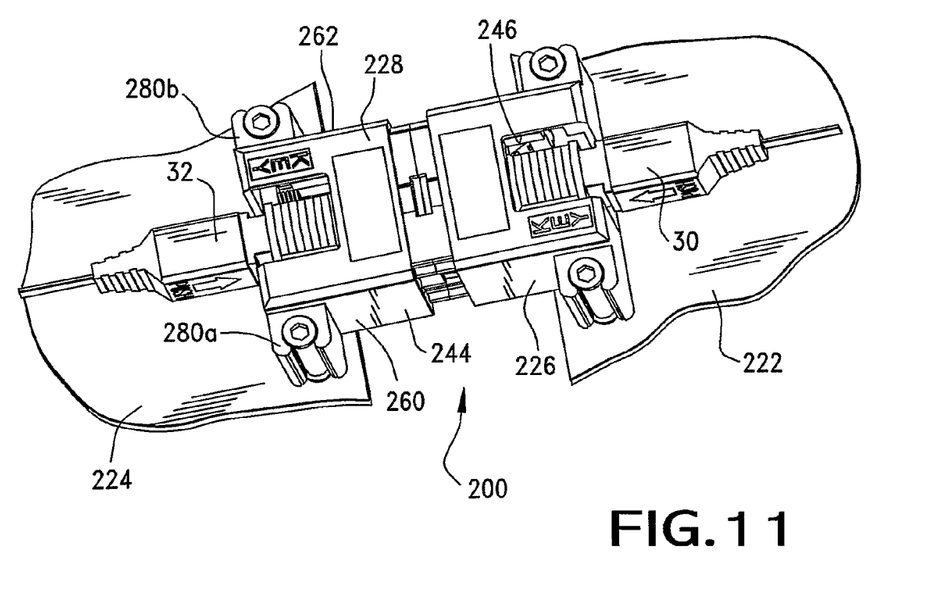
FIG. 11 is a perspective view of the hermaphroditic connector system in accordance with a second embodiment of the invention which incorporates the features of the invention, shown in a mated condition and mounted on printed wiring boards.

A first embodiment of the invention is shown in FIGS. 1-10 and a second embodiment of the invention is shown in FIG. 11.

Figure 1:
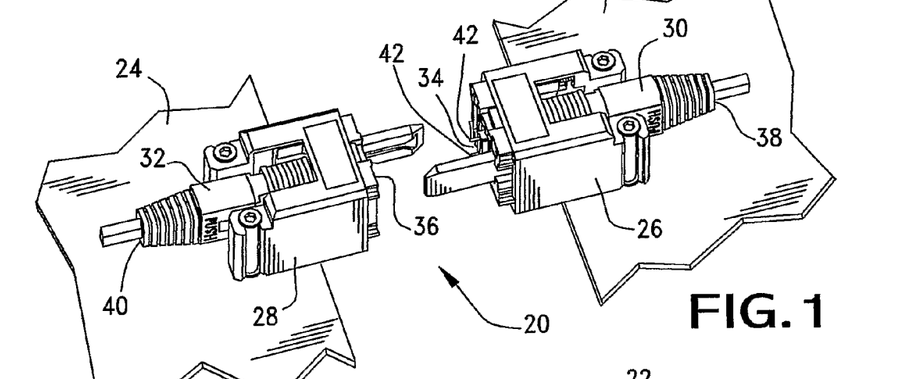
FIG. 1 is a perspective view of the hermaphroditic connector system which incorporates features of a first embodiment of the invention, shown in an unmated condition and mounted on printed wiring boards.
Figure 2:
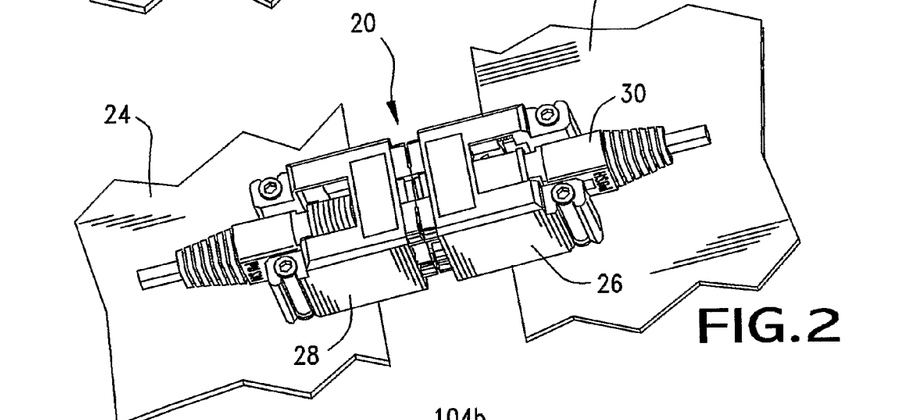
FIG. 2 is a perspective view of the hermaphroditic connector system of FIG. 1, shown in a mated condition and mounted on printed wiring boards.

As shown in FIGS. 1 and 2, the first embodiment of the hermaphroditic connector system 20 provides a fiber optical connection between a first printed wiring board 22 and a second printed wiring board 24. A first connector housing 26 is mounted on the first printed wiring board 22 and a male-type optical fiber connector 30 is positioned within the first housing 26. A second housing 28, identical to the first housing 26, is mounted on the second printed wiring board 24 and a female-type optical fiber connector 32 is positioned within the second housing 28. The identical housings 26, 28 provide a hermaphroditic connection between the first and second housings 26, 28.

Figure 4:
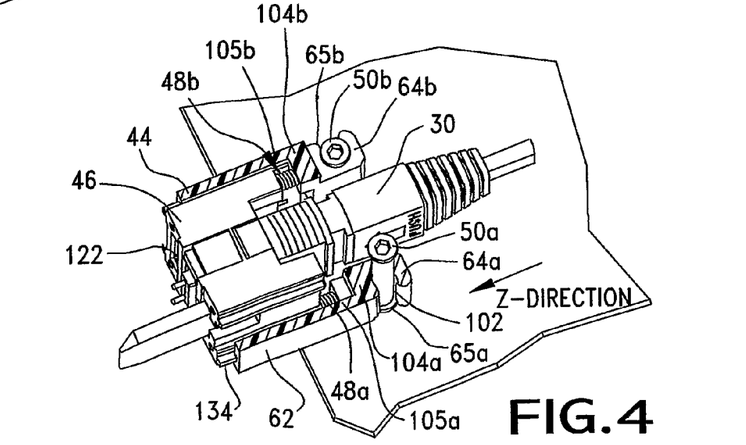
FIG. 4 is a stepped cross-sectional perspective view of portion of the hermaphroditic connector system shown in FIG. 1.
Figure 5:
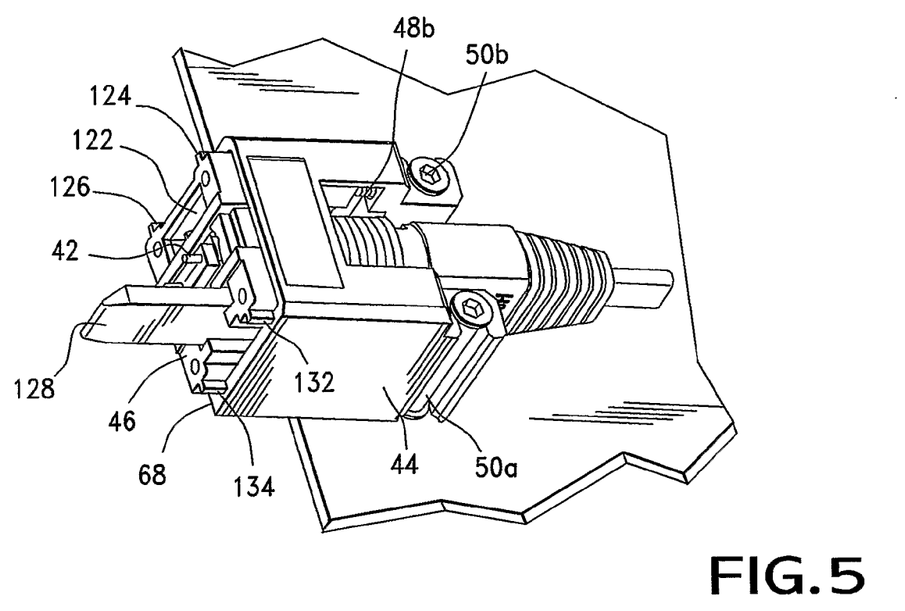
FIG. 5 is a mating side perspective view of a portion of the hermaphroditic connector system shown in FIG. 1.
Figure 6:
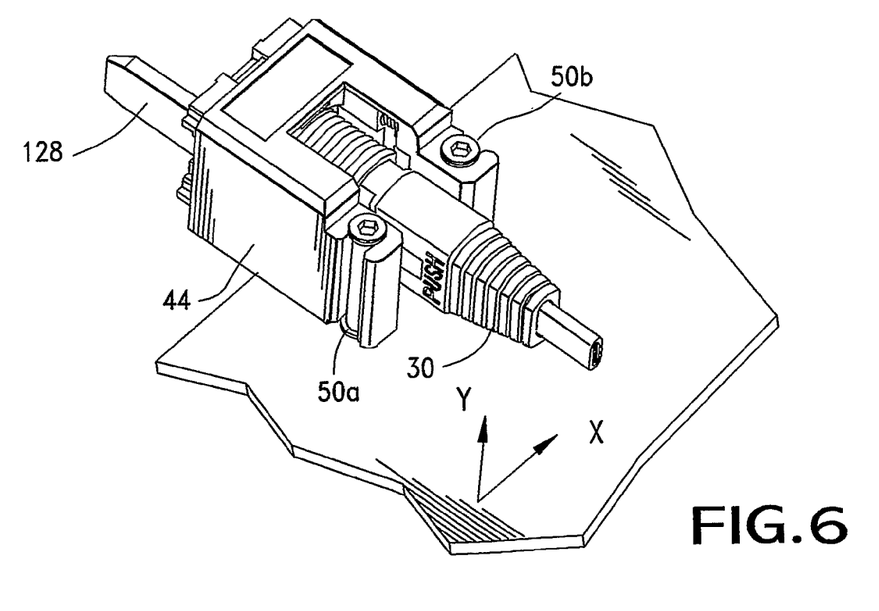
FIG. 6 is a rear side perspective view of a portion of the hermaphroditic connector system shown in FIG. 1.

Each optical fiber connector 30, 32 includes a mating end 34, 36 and a rear end 38, 40, respectively. When the first and second connector housings are mated as shown in FIG. 2, fibers within the female-type optical fiber connector 32 are mated with fibers within the male-type optical fiber connector 30. Herein the phrases "mating side", "mating end", "mating surface" or the like shall refer to elements, members and surfaces proximate the mating ends 34, 36 of the optical connector and the phrases "rear side", "rear end", "rear surface" or the like shall refer to elements, members and surfaces opposite the mating ends. The mating end 34 of the male-type optical fiber connector 30 includes conventional alignment members 42 extending from the mating surface of the connector 30. The mating end 36 of the female-type optical fiber connector 32 includes apertures extending from the mating end of the connector 32 which receive the alignment members 42 of the male-type connector 30. Movement (or restriction of movement) of the housings 26, 28, connectors 30, 32 or printed wiring board 22, 24 in particular directions will be described herein. Movement in the mating direction or Z direction is identified as shown in FIG. 4; movement in a direction perpendicular to the printed wiring boards is identified as a Y direction as shown in FIG. 6; and movement in a direction parallel to the printed wiring board and perpendicular to the mating (Z direction) is identified as an X direction and is also shown in FIG. 6.

Figure 3:
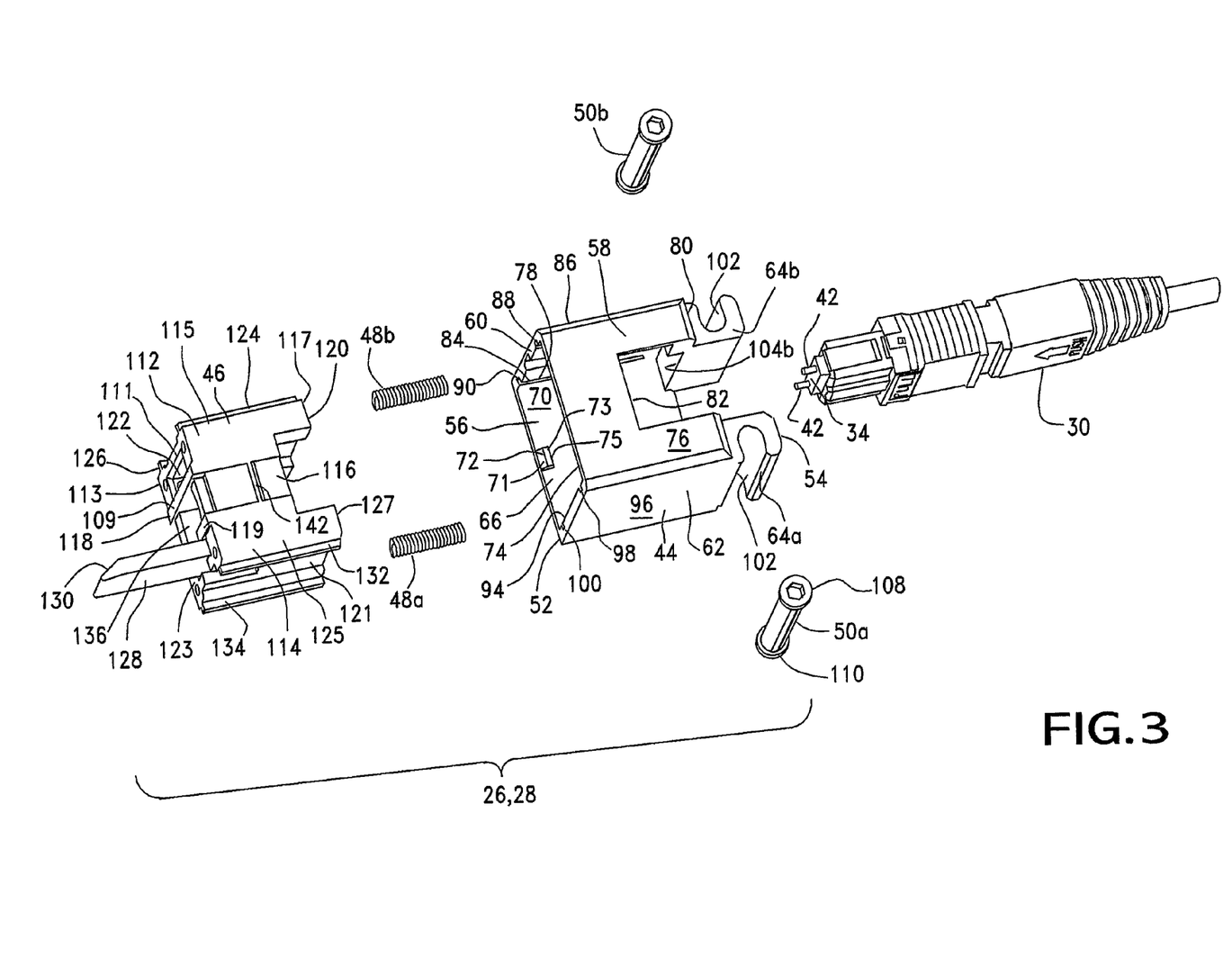
FIG. 3 is an exploded perspective view of a portion of the hermaphroditic connector system shown in FIG. 1.

Because the housings 26, 28 are identical, only the housing 26 is described with the understanding that 28 is identical in construction. As best shown in FIG. 3, the housing 26 includes an outer member 44, an inner member 46, springs 48a, 48b and studs 50a, 50b.

The outer member 44 of the housings 26, 28 includes a mating end 52, a rear end 54, a bottom, wall 56, a top wall 58, a first side wall 60, a second side wall 62 and mounting members 64a, 64b. An inner member cavity 66 is defined by inner surfaces of the bottom, top and side walls 56, 58, 60, 62 of the outer member 44 and extends from the mating end 52 to the rear end 54.

The bottom wall 56 is generally rectangularly-shaped and planar. The bottom wall 56 includes an outer surface 68 (see FIG. 5) which faces the printed wiring board 22 (the bottom wall of housing 28 faces the circuit board 24) and an inner surface 70. A protrusion 72 extends inwardly from the inner surface 70 of the bottom wall 66 proximate the mating end 52 of the connector 44 and is centered between the side walls 60, 62. The protrusion 72 includes a tapered surface 71, a flat surface 73, and a rear surface 75. The tapered surface 71 extends from the inner surface 70 of the bottom wall 66 and is angled relative to the bottom wall 66. The flat surface 73 extends from a rear end of the tapered surface 71 and is generally parallel to the bottom wall 66. The shoulder 75 is provided at the rear end of the flat surface 73. The rear surface 75 extends generally perpendicularly from the inner surface 70 of the bottom wall 66 and is generally perpendicular to the flat surface 73. A shoulder is formed by the flat surface 73 and the rear surface 75.

The top wall 58 is generally planar and is generally parallel to the bottom wall 56. The top wall 58 includes an inner surface 74 which faces the inner surface 70 of the bottom wall and an outer surface 76. A protrusion, identical to the protrusion 72 of the bottom wall 56, extends inwardly from the inner surface 74 of the top wall 58 proximate the mating end 42 of the outer member 44 and is centered between the side walls 60, 62. A cut out 82 is provided in the top wall 58 and extends in the mating direction from the rear end 52 of the outer member 44. Placement of the optical fiber connector 30, 32 within the connector housing 26, 28 can be viewed through the cutout 82.

The first side wall 60 is generally rectangularly-shaped and planar. The first side wall 60 extends from the bottom wall 56 to the top wall 58 at ends thereof and is generally perpendicular to the top and bottom walls 56, 58. The first side wall 60 includes an inner surface 84 and an outer surface 86. An upper channel 88 and a lower channel 90 extend outwardly from the inner surface 84. The upper channel 88 is spaced from the upper wall 58 a predetermined distance, the lower channel 90 is spaced from the lower wall 56 a predetermined distance, and the upper and lower channels 88, 90 are spaced from each other. The upper and lower channels 88, 90 extend rearwardly from the mating end 52 of the outer member 44 toward the rear end 54 of the outer member 44. The upper and lower and channels 88, 90 are generally parallel to each other.

The second side wall 62 is also generally rectangularly-shaped and planar. The second side wall 62 extends from the bottom wall 56 to the top wall 58 at ends thereof and is generally perpendicular to the top and bottom walls 56, 58. The second side wall 62 includes an inner surface 94 and an outer surface 96. An upper channel 98 and a lower channel 100 extend outwardly from the inner surface 94 of the second side wall 62. The upper channel 98 is spaced a predetermined distance from the upper wall 58, the lower channel 100 is spaced a predetermined distance from the lower wall 56, and the upper and lower channels 98, 100 are spaced a predetermined distance from each other. The upper and lower channels 98, 100 extend rearwardly from the mating end 52 of the outer member 44 toward the rear end 54 of the outer member 44. The upper and lower channels 98, 100 are generally parallel to each other.

The mounting members 64a, 64b are provided at the rear end 54 of the outer member 44. Mounting member 64a extends from the rear end of first side wall 60 and from the rear end of bottom wall 56 and the rear end of top wall 58 proximate the first side wall 60. Mounting member 64b extends from the rear end of second side wall 62 and from the rear end of bottom wall 56 and the rear end of top wall 58 proximate the second side wall 62. The mounting members 64a, 64b are generally C-shaped with side openings 65a, 65b accessible from the left and right sides of the outer member 44. The mounting members 64a, 64b are spaced apart to provide access to the inner member cavity 66. A generally cylindrically-shaped channel 102a, 102b is provided by each mounting member 64a, 64b to receive a stud 50a, 50b through side openings 65a, 65b. Walls 104a, 104b (see FIGS. 3 & 4) are provided by the mounting members 64a, 64b. Each wall 104a, 104b includes a cylindrically-shaped aperture 105a, 105b for receiving a rear end of a spring 48a, 48b therein.

The studs 50a, 50b are generally cylindrically-shaped and include an upper flange 108 and a lower flange 110. Fasteners 51 (see FIG. 10) are provided to attach the studs 50a, 50b to the printed wiring board. As will be described herein, the studs 50a, 50b are positioned within the channels 102 of the mounting members 64 to secure the outer member 44 to the printed wiring board 22. The diameter of the studs 50a, 50b relative to the dimension of the channels 102a, 102b is such that when the studs 50a, 50b are positioned within the channels 102a, 102b movement of the outer member 44 relative to the printed wiring board 22 in the mating or Z direction is prevented. This is because the diameter of the studs 50a, 50b, in the mating direction, is approximately the same as the diameter of the channels 102a, 102b, in the mating direction. However, movement of the outer member 44 relative to the printed wiring board 22 is permitted in the X direction due to the dimension of the studs 50a, 50b relative to the channels 102a, 102b. This is because the diameter of the studs 50a, 50b, in a direction perpendicular to the mating axis, is smaller than the diameter of the channels 102a, 102b. The length of the studs 50a, 50b relative to the length of the channels 102a, 102b is such that the upper flanges 108 are positioned above the upper surfaces of the mounting members 64a, 64b and the lower flanges 110 are positioned below the lower surface of the mounting members 64a, 64b. The length of the studs 50a, 50b is such that the outer member 44 is allowed to move in the Y direction relative to the respective printed wiring board 22, 24. Movement of the outer member 44 in the Y direction is limited by the contact of the flanges 110 of the studs 50a, 50b with the upper and lower surfaces of the mounting members 64a, 64b.

The inner member 46 is generally rectangularly-shaped and is sized to slide within the inner member cavity 66 of the outer housing member 44. The inner member 46 is preferably formed of a dielectric material. The inner member includes a first portion 112, a second portion 114, and a pair of walls 116, 118 extending between the first and second portions 112, 114. The inner member 46 includes a mating end 118 and a rear end 120.

The first portion 112 is generally rectangularly-shaped in cross-section and includes an inner wall 109, an outer wall 111, a lower wall 113, an upper wall 115 and a rear wall 117. The inner surfaces of the walls 109, 111, 113, 115, 117 define an alignment aperture 122 having a generally rectangularly-shaped cross-section. The alignment aperture 122 extends rearwardly from the mating end 118 of the inner member 46. An upper rail 124 extends outwardly from the outer wall 111 and is spaced from the upper wall 115. The upper rail 124 includes an upper surface, a lower surface parallel to the upper surface and an outer surface extending from the upper surface of the rail to the lower surface of the rail. The outer surface is generally perpendicular to the upper and lower surfaces. A lower rail 126 extends outwardly from the outer wall 111 and is spaced from the lower wall 113. The lower rail includes an upper surface, a lower surface parallel to the upper surface and an outer surface extending from the upper surface of the rail to the lower surface of the rail. The outer surface is generally perpendicular to the upper and lower surfaces. The upper and lower rails 124, 126 are positioned generally parallel to one another and extend from the mating end 118 of the inner member 46 to the rear end 120 of the inner member 46. The rear wall 117 defines a cylindrically-shaped spring aperture which extends from the rear end 120 of the inner member 46 toward the mating end 118 of the inner member 46 to receive a mating end of a spring 48.

The second portion 114 is generally rectangularly-shaped in cross-section and includes an inner wall 119, an outer wall 121, a lower wall 123, an upper wall 125, a rear wall 127, and a front wall 129. An alignment member 128 extends in the mating direction from the front wall 129. The alignment member 128 has a generally rectangularly-shaped cross-section and a tapered free end 130. An upper rail 132 extends outwardly from the outer wall 122 and is spaced from the upper wall 125. The upper rail 132 includes an upper surface, a lower surface parallel to the upper surface and an outer surface extending from the upper surface of the rail to the lower surface of the rail. The outer surface is generally perpendicular to the upper and lower surfaces. upper wall. A lower rail 134 extends outwardly from the outer wall 122 and is spaced from the lower wall 123. The lower rail 134 includes an upper surface, a lower surface parallel to the upper surface and an outer surface extending from the upper surface of the rail to the lower surface of the rail. The outer surface is generally perpendicular to the upper and lower surfaces. The upper and lower rails 132, 134 are positioned generally parallel to one another and extend from the mating end 118 of the inner member 46 to the rear end 120 of the inner member 46. The rear wall 127 defines a cylindrically-shaped spring aperture which extends from the rear end 120 of the inner member 46 toward the mating end 118 of the inner member 46 to receive a mating end of a spring 48.

Upper wall 116 is generally rectangularly-shaped and extends between the inner wall 109 of the first portion 112 and inner wall 119 of the second portion 114 proximate the upper ends thereof. Lower wall 118 is generally rectangularly-shaped and extends between the inner wall 109 of the first portion 112 and inner wall 119 of the second portion 114 proximate the lower ends thereof. Walls 116, 118, 109, 119 define a connector aperture 136. A rail 142 is provided on the upper surface of the upper wall 116. The rail 142 extends from the upper wall 115 of the first portion 112 to the upper wall 125 of the second portion 114 and interacts with the protrusion 72 of the outer member 44 as will be described herein. An identical rail is provided on the lower surface of lower wall 118. The rail extends from the lower wall 113 of the first portion 112 to the lower wall 123 of the second portion 114 and interacts with the protrusion 72 of the outer member 44 as will be described herein.

The springs 48a, 48b are compression type springs. The diameter of the springs 48a, 48b is slightly smaller than the diameter of the spring apertures 105a, 105b in the mounting members 64a, 64b which receives the rear end of the springs 48a, 48b. In addition, the diameter of the springs 48a, 48b is slightly smaller than the diameter of the spring apertures of the inner member 46. The springs 48a, 48b are longer than the space provided between the inner member 46 and the outer member 44 such that the springs provide a force between the inner member 46 and the outer member 44. Preferably the springs 48a, 48b are pre-compressed to 2.2 lbs.

Figure 7:
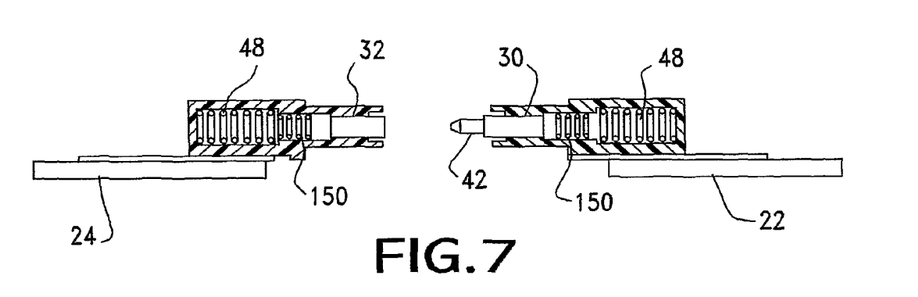
FIG. 7 is a cross-sectional schematic of the hermaphroditic connector system in an unmated condition shown in FIG. 1.
Figure 8:
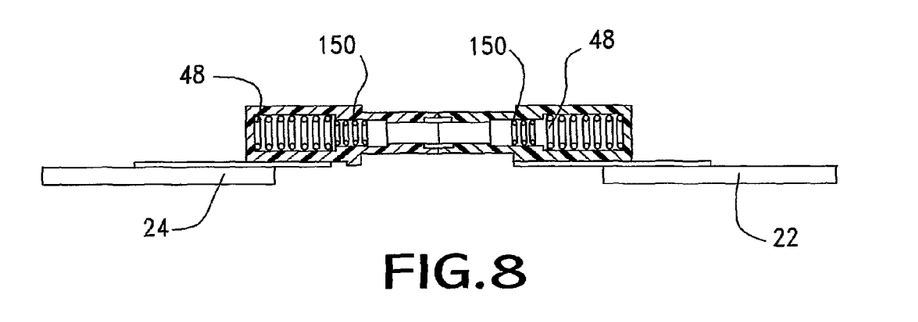
FIG. 8 is a cross-sectional schematic of the hermaphroditic connector system in a preliminary mated condition shown in FIG. 1.

The optical fiber connector 30 is a standard male-type connector typically used for mating optical fibers. A plurality of optical fibers are aligned within the connector 30. As previously described, the connector 30 includes a mating end 34 and alignment pins 42 extending from the mating end 34. The mating end of each optical fiber is positioned within a ferrule and provided at the mating end 34 of the connector 30. The optical fiber connector 32 is a standard female-type connector typically used for mating optical fibers. A plurality of optical fibers are aligned within the connector 32. As previously described, the connector 32 includes a mating end 36 and alignment recess extend from the mating end to receive the alignment pins 42 of the connector 30. As best shown in FIGS. 7-9, the each connector 30, 32 includes an alignment spring 150 to force the mating ends of the optical fibers in the mating direction. The alignment spring 150 is preferably pre-compressed to 1.8 lbs.

Each housing 26, 28 is assembled as follows. First, the outer member 44 is aligned with the respective printed wiring board 22, 24 and studs 50a, 50b are positioned within the channels 102 of the mounting members 64a, 64b of the outer members 44. The studs 50a, 50b are then secured to the printed wiring board 22, 24 to secure each outer member 44 to a respective printed wiring board 22, 24. When secured, movement, as described above is permitted between the outer member 44 and the respective printed wiring board 22, 24 in the Y direction and in the X direction, however, movement is prevented in the mating direction or Z direction.

Next, the mating ends of the springs 48a, 48b are positioned within the apertures at the rear end 120 of the inner member 46. The rear end 120 of the inner member 46 is then positioned proximate the mating end 52 of the outer member 44 such that the inner member 46 is aligned with the inner member cavity 66 of the outer member 44, the rails 132, 134 of the first portion 112 of the inner member 46 are aligned with the channels 88, 90 in the first side wall 60 of the outer member 44, and the rails 132, 134 of the second portion 114 of the inner member 46 are aligned with the channels of the second wall 62 of the outer member 44. The inner member 46 is then slid rearwardly within the inner member cavity 66 of the outer member 44. As the inner member 46 is slid rearwardly, the rails 124, 126 of the first portion 112 of the inner member 46 slide within the channels 88, 90 of the first wall 60 of the outer member 44 and the rails 132, 134 of the second portion 114 are positioned within the channels of the second wall 62 of the outer member 44. When the tapered wall 71 of the protrusions 72 of the upper and lower walls 56, 58 contact the front wall of the rails 142 on the upper and lower walls 116, 118 of the inner member 46, the upper and lower walls 56, 58 of the outer member 44 will flex outwardly. As the inner member 46 is moved further in the rearward direction, the rails 142 will move beyond the shoulders defined by the flat wall 73 and the rear wall 75 of the protrusions 72, and the upper and lower walls 56, 58 of the outer member will return to their original position. With the rails 142 of the inner member 46 positioned beyond the protrusions 72 the rails 142 abut the shoulders of the protrusions 72 and displacement of the inner member 46 outside of the outer member 44 is prevented.

As the inner member 46 is slid within the outer member 44, the rear ends of the springs 48 are positioned within the spring recesses 105a, 105b of the outer member 44. With the inner and outer members 46, 44 latched, the springs 48 are preferably pre-compressed to 2.2 lbs. and movement of the inner member 46 relative to the outer member 44 is provided in a direction shown by the arrow Z (see FIG. 4), i.e. the mating direction.

The studs 50a, 50b are placed within the channels 102 of the outer members 44 and secured to the printed wiring boards 22, 24 using fasteners 51 to secure the outer members 44 to the printed wiring boards 22, 24. The outer members 44 together with the printed wiring boards 22, 24 travel relative to the inner members 46 in the Z direction while the springs 48 compress and expand. Such movement compensates for tolerances in the Z direction. The studs 50a, 50b also provide tolerance compensation in the X and Y directions due to the relative dimensions of the studs 50a, 50b and the channels 102a, 102b.

A standard male-type connector 30 is then inserted within the connector aperture 136 of the first housing 26 and a standard female-type connector 32 is inserted within connector aperture 136 of a second housing 28. Placement of the connectors 30, 32 within the apertures 136 of the housing 26, 28 can be observed through cutout 82 of the outer member 44. The first and second housings 26, 28 are then mated by aligning the alignment member 128 of the first connector 26 with the alignment recess 122 of the second connector 28 and aligning the alignment member 128 of the second connector 28 with the alignment recess 122 of the first connector. As the housing 26, 28 and their respective printed wiring boards 22, 24 are moved in the mating direction, the alignment members 128 are positioned within the recesses 122. Although the alignment members 128 and the alignment recesses 122 have been described as having a rectangular cross-section, it is to be understood that the members 128 and recesses 122 could have cross-sections of any shape so long as the members 128 and recesses 122 can mate together. As the housings 26, 28 are moved in the mating direction, the alignment pins 42 of the male connector 30 are received by recesses of the female connector 32 to achieve mating of the connectors 30, 32. Mating of the connectors 30, 32 provides compression of the springs 150 of the connectors 30, 32 as shown in FIG. 8. Continued movement of the housings 26, 28 in the mating direction provides further compression of the springs 48a, 48b of the housings 26, 28 as shown in FIG. 9. Thus, a series of spring compressions is provided by the springs 150 and the springs 48a, 48b.

As shown, the hermaphrodic connector system 20 provides for direct connection between first and second housings 26, 28 without the use of an adaptor. This connection is achieved with identical first and second housings 26, 28 which results in a lower cost per part due to reduced tooling. The inner member 46 each housing 26, 28 is movable relative to the outer member 44. The springs 48a, 48b 150a, 150 b provide a series of biasing elements which provide compensation for gross misalignment of the connectors 30,32 in a longitudinal direction and finer compensation for misalignment of the optical fibers ferrules within the connectors 30, 32.

The connector system 20 can be used in a back plane arrangement. As shown in FIG. 10, the printed wiring board 166 provides a vertical backplane which is perpendicular to the printed wiring board 22. The backplane 166 has a front surface 166a and a rear surface 166b. An aperture 168 is provided through the backplane 166 and the connector 28 extends through the aperture 168. A bracket 170 secures the outer member 44 of the housing 28 to the backplane 166. The bracket 170 includes a first portion 172 and a second portion 174 which is perpendicular to the first portion 172 and extends from an end of the first portion 172. The first portion 172 is positioned proximate the outer surface 68 of the bottom wall 65 of the outer member 44 and extends through the aperture 168. The fasteners 51 extend through the first portion 172 of the bracket 170 and mate with the studs 50a, 50b to secure the outer members 44 to the bracket 170. The second portion 174 extends away from the bottom wall 65 and is positioned proximate the front surface 166a of the backplane 166. Apertures are provided through the second portion 174 of the bracket 170 to provide attachment of the bracket 170 to the backplane 166 by fasteners 176.

A second embodiment of the hermaphroditic connector system is shown in FIG. 11. The connector system 200 is identical to the connector system 20 except as will be described herein. The connector system 200 includes a first connector housing 226 mounted to a first printed wiring board 222 and a second connector housing 228 mounted to a second printed wiring board 224. A male-type optical fiber connector 30 is positioned within the first housing 226 and a female-type optical fiber connector 32 is positioned within the second housing 228.

The first and second housings 226, 228 are identical. Each housing 226, 228 includes an outer housing member 244 and an inner housing member 246. The outer members 244 include mounting members 280a, 280b. The housing members 226, 228 are identical to the housing members 26, 28, with the exception of the placement of the mounting member 280a, 280b. Unlike the mounting members 64a, 64b of the connectors 26, 28, which extend toward the rear of the housings 26, 28, the mounting members 280a, 280b are positioned proximate the first and second side walls 260, 262 of the connectors 226, 228.

While preferred embodiments of the present invention is shown and described, it is envisioned that those skilled in the art may devise various modifications of the present invention without departing from the spirit and scope of the appended claims.

The invention claimed is:

1. A connector system for mating first and second optical fiber connectors having optical fibers therein defining a mating axis, the connector system comprising:

a first housing, the first housing including a first outer member capable of being secured to a printed wiring board, a first inner member engaged with the first outer member and capable of receiving the first optical fiber connector, and at least one spring mounted between the first outer member and the first inner member for biasing the first inner member from the first outer member; and a second housing, the second housing including a second outer member capable of being secured to a printed wiring board, a second inner member engaged with the second outer member and capable of receiving the second optical fiber connector, and at least one spring mounted between the second outer member and the second inner member for biasing the second inner member from the second outer member;

wherein:
each housing further includes at least one mounting stud and at least one channel for receiving the mounting stud;
each channel being disposed within a mounting member, each mounting member being generally C-shaped with an opening running lengthwise up the side of the mounting member;
each mounting stud is longer than each channel to permit movement of each mounting stud within each channel in a direction perpendicular to the mating axis; and
the first housing directly mates with the second housing to provide a mating of the first and second optical fiber connectors along the mating axis.

2. The connector system of claim 1, wherein the first and second housings are identical.

3. The connector system of claim 1, wherein each outer member includes a protrusion and each inner member includes a rail for engagement with the protrusion to limit movement of the inner member relative to the outer member in the mating direction.

4. The connector system of claim 1, wherein each outer member includes an inner surface having a channel extending thereon, each inner member includes an outer surface having a rail extending therefrom, and the channel receives the rail when each inner member is positioned within one of the outer members.

5. The connector system of claim 1, wherein:
each inner member of one of the housings includes a mating end which faces the inner member of the other housing, an alignment member extending outwardly from the mating end and an alignment aperture extending inwardly from the mating end; and
when the inner members are mated, the alignment member of the first housing is positioned within the alignment aperture of the second housing and the alignment member of the second housing is positioned within the alignment aperture of the first housing.

6. A connector system as defined in claim 1, wherein each inner member includes a spring aperture for receiving an end of one of the springs and each outer member includes a spring aperture for receiving an opposite end of one of the springs.

7. A connector system as defined in claim 1, wherein the diameter of each mounting stud in a direction perpendicular to the mating axis is smaller than the diameter of each channel to permit movement of the outer member relative to each mounting stud.

8. A connector system as defined in claim 1, wherein the diameter of each mounting stud in the mating direction is approximately the same as the diameter of each channel in the mating direction to prevent movement of the outer member relative to each mounting stud.

9. A connector system as defined in claim 1, wherein each optical fiber connector includes a connector spring for biasing the optical fibers along the mating axis and wherein a force of each connector spring is smaller than the force of spring of each housing.

* * * * *